United States Patent [19]

Bausch

[11] Patent Number: 4,955,853
[45] Date of Patent: Sep. 11, 1990

[54] DIFFERENTIAL GEAR UNIT FOR MOTOR VEHICLE DRIVE AXLES

[75] Inventor: Paul Bausch, Hattenheim, Fed. Rep. of Germany

[73] Assignee: General Motors Corporation, Detroit, Mich.

[21] Appl. No.: 321,135

[22] Filed: Mar. 9, 1989

[30] Foreign Application Priority Data

Mar. 12, 1988 [DE] Fed. Rep. of Germany ....... 3808402

[51] Int. Cl.⁵ .................. F16H 1/44; F16D 27/118; F16D 23/10
[52] U.S. Cl. .................. 475/241; 475/231; 475/237; 192/84 C; 192/103 R
[58] Field of Search .............. 74/710, 710.5, 711; 192/3.52, 103 R, 84 C; 475/220, 230, 231, 233, 235, 237, 238, 240, 241

[56] References Cited

U.S. PATENT DOCUMENTS

| | | | |
|---|---|---|---|
| 3,400,610 | 9/1968 | Taylor et al. | 74/710.5 |
| 3,402,793 | 9/1968 | Scholl | 192/103 R |
| 4,549,448 | 10/1985 | Kittle | 74/710 |
| 4,627,525 | 12/1986 | Geldec | 192/103 R |
| 4,715,248 | 12/1987 | Gant | 74/710.5 |
| 4,805,486 | 2/1989 | Hagiwara et al. | 475/231 |
| 4,828,090 | 5/1989 | Matsushita | 192/84 C |
| 4,828,091 | 5/1989 | Gustin | 192/84 C |
| 4,841,808 | 6/1989 | Ouchi et al. | 74/711 |

FOREIGN PATENT DOCUMENTS

| | | | |
|---|---|---|---|
| 176827 | 9/1985 | Japan | 74/710 |
| 88/07639 | 10/1988 | World Int. Prop. O. | 74/711 |

Primary Examiner—Leslie A. Braun
Assistant Examiner—Benjamin Levi
Attorney, Agent, or Firm—F. J. Fodale

[57] ABSTRACT

A differential gear unit for the drive axles of motor vehicles has a positive differential lock comprising a jaw clutch plate which is connected non-rotatably but movable axially with the differential case and which works in conjunction with a jaw clutch counterplate which is mounted non-rotatably and axially immobile on a differential gear drive shaft. The jaw clutch plate also serves as an armature for an electromagnet shaped as a ring magnet, which can be switched on and off manually. The jaw clutch plate is released from the jaw clutch counterplate by the preloaded spring means when the ring magnet is switched off. The electric circuit for controlling the ring magnet includes an electronic control unit developed as a velocity sensor which allows switching on of the ring magnet only below a predetermined velocity limit of the vehicle. Above this velocity limit the ring magnet switches off automatically.

7 Claims, 2 Drawing Sheets

DIFFERENTIAL GEAR UNIT FOR MOTOR VEHICLE DRIVE AXLES

BACKGROUND OF THE INVENTION

This invention concerns a differential gear unit for motor vehicle drive axles having a positive differential lock which comprises a jaw clutch plate which is non-rotatably connected to the housing for the differential gear (differential case) but is axially movable with respect to the same. The jaw clutch plate cooperates with a jaw clutch counterplate which is mounted non-rotatably and axially fixed on the associated wheel drive shaft. The jaw clutch plate also serves as an armature for an electromagnet formed as a magnetic ring, which can be switched on and off manually.

International Patent Application WO 86/01467 discloses a steering drive axle, that is, the front axle of an automobile which has a differential lock. The operation of the differential lock consists essentially of a lock differential and a jaw clutch plate connected thereto, which by means of an electromagnetic positioning element connects the wheel drive shaft with the driven part of the lock differential so long as a presettable deflection angle stop value is attained or exceeded. The switching in and out of the known lock differential is thus deflection angle dependent.

SUMMARY OF THE INVENTION

The object of the present invention is to provide a differential gear unit having a positive differential lock which operates independently of deflection angle and thus is applicable for both front and rear drive axles and which is connectable only for low motor vehicle speeds and automatically disconnectable on exceeding these low speeds. In this way the driveability of the motor vehicle on poor road surfaces, such as extreme microsplit, for example, can be improved. At the same time, the best possible running gear coordination, which can be achieved only with an open or unlocked differential remains assured.

According to the invention, the object is achieved in that the jaw clutch plate can be released from the jaw clutch counterplate by spring means which are biased when the jaw clutch plate is engaged and in that the ring magnet is fixed to the differential housing, and in that an electronic control unit constructed as a speed sensor is disposed in the circuit between the switch and ring magnet, which permits the ring magnet to be switched on only below a predetermined limit speed of the motor vehicle, and which automatically switches the ring magnet off above this limit speed.

The invention produces the advantage that the traction for a motor vehicle which could no longer be started up under extremely slippery or icy conditions, is improved considerably in a velocity range of 0 up to an upper velocity limit of 20 km per hour, for example. The traction improvement attained by the invention has no negative effects at all on driving characteristics and steering at higher vehicle velocities, however. The necessary complicated constructional measures and high costs associated therewith for known electronic differential locks for rear axle differentials are avoided by means of the present invention.

By fixing the ring magnet to the differential housing according to the invention, as opposed to the known solution according to International Application WO 86/01467 where the ring magnet is formed as a rotating part on the drive shaft, construction outlay is substantially simplified. The inertial forces on the rotating wheel drive shaft are lowered, and the electrical supply to the stationary magnet ring is more simple arranged.

According to one advantageous embodiment of the invention, the magnet ring is disposed immediately on the inner wall of the differential housing, opposite the driving gear of the differential case. In this variant of the invention, the entire differential lock of the invention is integrated within the differential drive housing.

According to another embodiment of the invention, it is proposed that the ring magnet be fastened to the inner wall of a supplementary housing which is flange connected to the differential housing, and which also contains the jaw clutch plate and the jaw clutch counterplate.

This variation of the invention is especially well suited for application to front-wheel-drive automobiles, because the differential lock unit contained in the supplementary housing according to the invention can be installed in an existing differential without great expenditure.

Thus, an important advantage of the present invention is that it provides a simple integration of the differential lock in the drive train of the front-wheel-drive automobile. By means of the differential lock of the invention, the drive shaft leading to the associated drive wheel is also shortened, whereby oscillation problems and side-pulling can be avoided.

According to a further advantageous embodiment of the invention, the jaw clutch counterplate mounted on the wheel drive axle which is spatially associated with the jaw clutch plate is disposed within a cylindrical chamber formed or surrounded by the ring magnet.

This improvement of the invention is distinguished correspondingly by a space-saving arrangement and development of the differential lock. In this sense, it has also been shown to be very expedient to connect the jaw clutch plate through the spring element directly with the driving gear of the differential case. Of course, the latter variant presupposes an integration of the differential lock in the differential housing.

For the case when a supplementary housing is used to accommodate the differential lock, it is also expedient if the supplementary housing is flange connected on the side of the differential housing where the drive gear of the differential case is located.

According to another form of execution, which is suited especially for application to front-wheel-driven motor vehicles, where the differential housing is flange connected to or part of the gear box housing, it is also possible to flange assembly the supplementary housing on the side facing away from the driving gear of the differential case either to the differential housing or to the gear box housing.

With respect to the spring element for disengaging the jaw clutch plate of the invention, these spring means can directly connect the jaw clutch plate to the differential case or a part connected with the differential case, for example the drive gear of the differential case. The spring elements, in this case pressure springs, can however also be disposed between the jaw clutch plate and the jaw clutch counterplate.

Other objects and features of the invention will become apparent to those skilled in the art as disclosure is made in the following detailed description of preferred embodiments of the invention which sets forth the best modes of the invention contemplated by the inventor and which is illustrated in the accompanying sheet(s) of drawing.

DETAILED DESCRIPTION OF THE EMBODIMENTS

Figure 1:
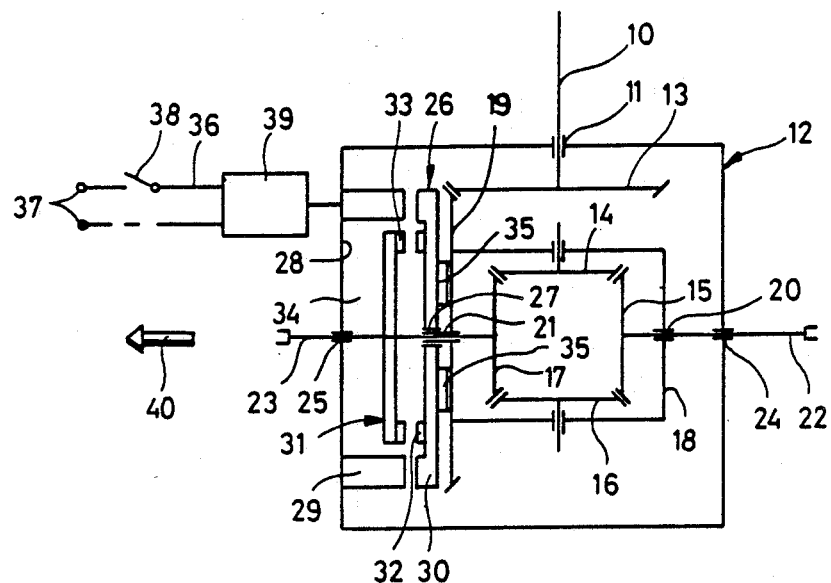
FIG. 1 is a schematic sectional representation of an embodiment of a differential drive unit according to the invention.

The subject matter of FIG. 1 concerns a differential drive unit for a rear-axle-driven motor vehicle. The vehicle has a drive shaft 10 which is introduced into a differential drive unit housing 12 at 1. The end of the drive shaft 10 which is inside the differential housing 12 has a drive pinion 13 fashioned as a bevel gear. The differential drive gears 14–17, likewise formed as bevel gears, are also disposed within the differential housing 12 and mesh with each other in the usual manner. The differential gears 14–17 are surrounded by and supported in a differential case 18 which is driven by a drive gear 19 which is fastened firmly to the case 18 and meshes with the drive pinion 13 of the drive shaft 10. The differential case 18 and the drive gear 19 have openings 20 and 21, through which the gear drive axles 22 and 23 connected with the differential gears 15 and 17 are led out of the differential case 18. The gear drive axles 22 and 23 also pass through the differential housing 12 at 24 and 25 for connection to the rear axle shafts (not shown).

The differential gear drive housing 12 further includes a locking mechanism through which the differential can be completely locked up under certain conditions. The lock mechanism comprises a jaw clutch plate 26, which is connected with the drive gear 19 of the differential case at 27 so that the jaw clutch plate 26 is non-rotatable but movable in the axial direction with respect to the drive gear 19 and the differential case 18. A ring magnet 29 is fastened to the inner wall 28 of the differential housing 12 lying opposite to the jaw clutch plate 26. The jaw clutch plate 26 cooperates with the ring magnet 29 and is fashioned for this purpose as a magnetic armature at 30. The jaw clutch plate 26 furthermore works together with a jaw clutch counterplate 31, which is mounted non-rotatably and axially immobile on the gear drive axle 23. For this purpose the jaw clutch plate 26 has coupling claws 32 and the jaw clutch coupling counterplate 31 is provided with opposing claws 33 in a corresponding manner. The jaw clutch counterplate 31 is disposed in a space-saving manner within the cylindrical space 34 formed by the ring magnet 34 or surrounded by it.

As can be seen further from FIG. 1, the jaw clutch plate 26 is connected with the differential case 18 or the drive gear 19 of the same at its surface facing away from the jaw clutch counterplate 31 by spring means 35. The spring means 35 is formed as an annular spring in the embodiment example shown in FIG. 1, but the spring means 35 can also be shaped in other ways, for example as coil springs.

The ring magnet 29 fastened to the housing is connected to a current source 37 through an electrical circuit 36. The circuit 36 includes a manually operable switch 38 by which current feed to the ring magnet 29 can be switched on and off. An electronic control unit 39 designed as a velocity sensor is also disposed in the electric circuit 36 so that it likewise works in conjunction with the ring magnet 29. The control unit 39 is planned in such a way that current feed to the ring magnet 39 is interrupted automatically at higher motor vehicle velocities, for example over 20 km per hour. Correspondingly, the control unit 39 restores current flow to the ring magnet 29 automatically when the velocity is less than the limiting value, provided switch 38 is closed.

When the ring magnet 29 is fed by the electrical current source 37, that is, when switch 38 is closed, with simultaneous low vehicle velocity (for example, for a speed less than 20 km per hour), a magnetic field is formed in the ring magnet 29, and the jaw clutch plate 26 which also functions as an armature for the ring magnet 29 is moved in the direction of the arrow 40 against the restraining force of the spring means 35. Finally the coupling claws 32 engage with the counterclaws 33, and the jaw clutch 26, 31 is thus engaged. This means a positive connection of the gear drive axle 23 with the differential case 18, and the differential gear drive is thereby completely locked up.

In order to unlock the differential lock, it is necessary, as stated previously, to open the switch 38 manually and/or raise the speed of the vehicle above the stated limiting speed. The ring magnet 29 switched off of electrical current input consequently releases the jaw clutch plate 26, and this can be moved back by spring means 35 into its disengaged position shown in FIG. 1. The differential lock is thereby unlocked.

Figure 2:
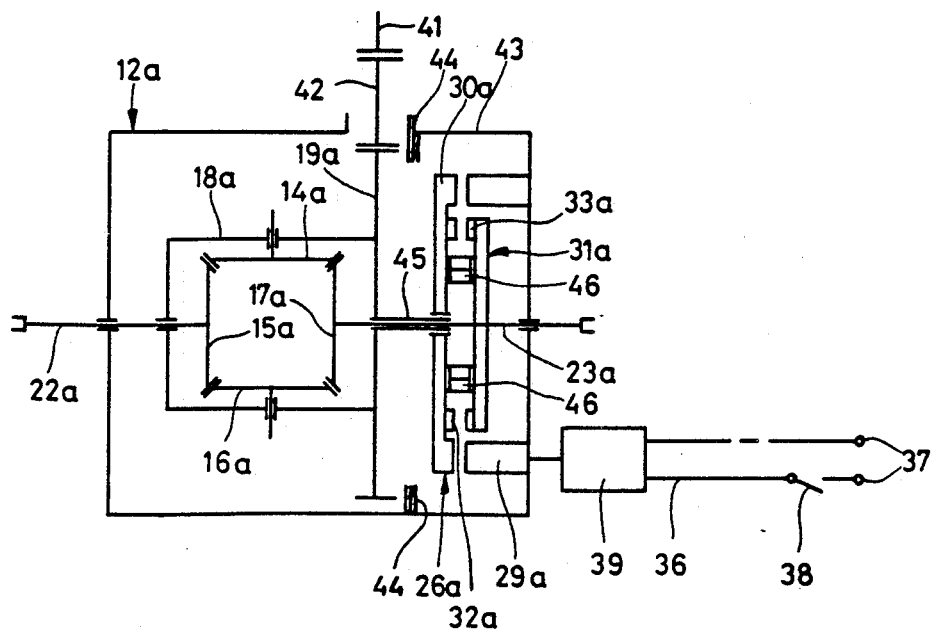
FIG. 2 is a schematic sectional representation of another embodiment of a differential drive unit according to the invention.

In FIG. 2 a differential gear unit provided for a front-wheel-drive vehicle is shown, whose function corresponds by and large to the rear-axle drive differential gear unit according to FIG. 1. The corresponding parts of the embodiment according to FIG. 1 are therefore shown in FIG. 2 with the same reference numerals, but supplemented with the index a. Corresponding to what has been stated above, both gear wheel drive axles 22a and 23a lead in the matter of FIG. 2 to the front wheels of the vehicle involved. In distinction to the embodiment according to FIG. 1, the drive gear 19a for the differential case 18a for the embodiment of FIG. 2 is formed not as a bevel gear but as a spur gear. It is driven by a partially shown output drive gear 41 (of an otherwise unshown gear box) by interposition of an additional gear wheel 42.

A significant difference from the embodiment of FIG. 1 lies in the fact that the jaw clutch consisting of the jaw clutch plate 26a, jaw clutch counterplate 31a, and ring magnet 29a which lock the differential is disposed in a separate supplementary housing 43 rather than within the differential gear unit 12a itself. The supplementary housing 43 is flange connected to the differential drive housing 12a at 44. Additionally, the jaw clutch plate 26a is disposed axially movable but non-rotatably on a sleeve 45 connected to the differential case 18a or with the drive gear 19a connected thereto. In further distinction from the embodiment according to FIG. 1, jaw clutch plate 26a and jaw clutch counterplate 31a engage each other directly through spring means 46 which must allow differences in rotational speed between plates 26a and 31a. The spring means 46 may take the form of annular or coil springs.

With regard to operation of the jaw clutch 26a, 31a (differential lock) by the electric circuit 36 and control unit 39, what has been stated previously concerning the embodiment of FIG. 1 also applies.

Figure 3:
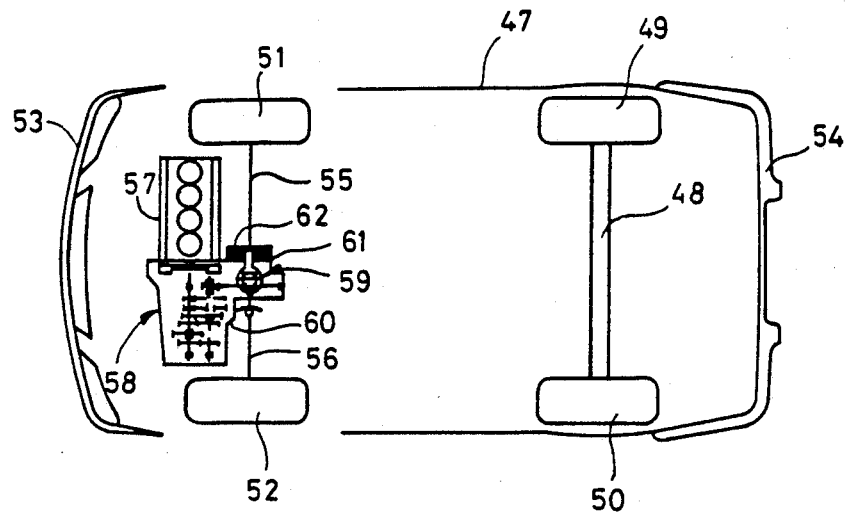
FIG. 3 is a schematic plan view of the undercarriage of a passenger motor vehicle having a front-wheel drive train which includes a differential drive unit according to another embodiment of the invention.

In FIG. 3, 47 designates the outline of the body of the passenger automobile represented. The non-driven rear axle is shown as 48, and the two rear wheels are shown as 49, 50. The two front-driven wheels carry the designations 51 and 52. A front and a rear bumper are numbered 53 and 54 respectively. The two front wheels 51, 52 are driven by drive axles 55 and 56 respectively. In the direction of travel in front of the two drive axles 55, 56, a four-cylinder motor block 57 is disposed transversely with a flange attached gear box 58. A schematically represented differential gear unit is designated by 59. It is driven by the gear box 58 and is accommodated with the gear box 58 in a common housing 60.

As can be discerned further from FIG. 3, the differential gear unit 59 is supplemented by a differential lock 62 disposed in a supplementary housing 61, indicated only schematically. The supplementary housing 61 with the differential lock 62 is flange connected, similarly as for the embodiment of FIG. 2, to the common gear box/differential housing 60. The differential lock 62 itself can be formed in a manner similar to that represented in FIG. 2.

Figure 4:
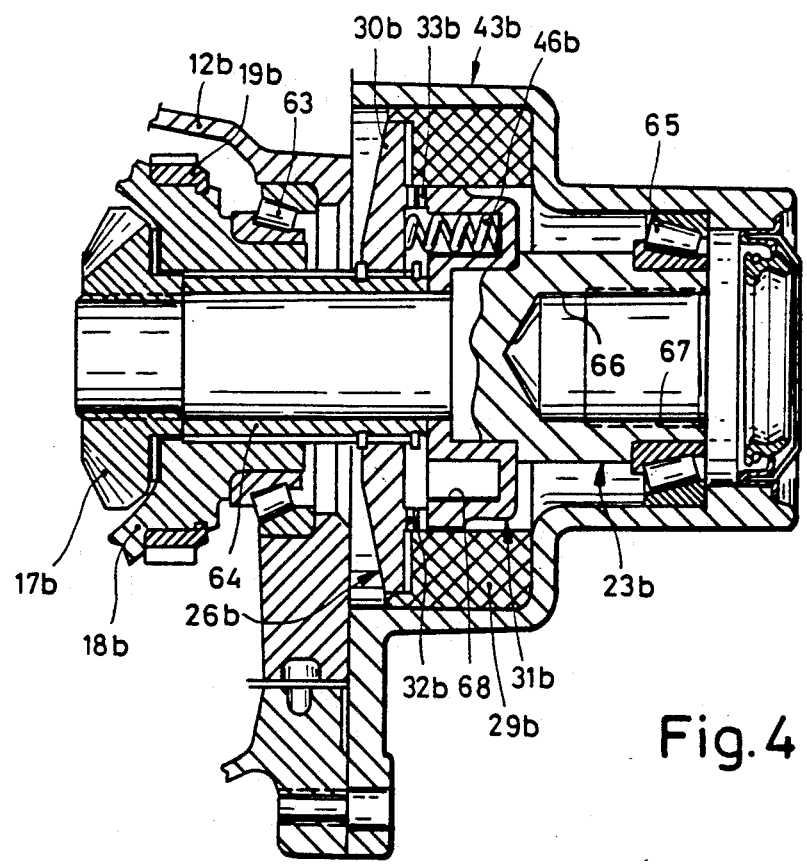
FIG. 4 is a partial view of yet another embodiment of a differential drive unit according to the invention, in longitudinal section.

FIG. 4 shows a more detailed development of such a differential lock. The embodiment according to FIG. 4 is somewhat comparable with the schematically indicated embodiment of FIG. 2. The parts corresponding to the embodiment of FIG. 2 are therefore provided with the same reference numerals as there but supplemented by the index b. Also for the embodiment according to FIG. 4, the differential lock is accommodated in a supplementary housing, which is designed by 43b and is connected by a flange to the differential gear unit housing 12b.

The drive gear 19b for the differential case 18b is seated in the differential drive housing 12b by means of a tapered roller bearing 63. The differential case 18b is non-rotatably mounted on a sleeve 64 which projects out from the differential housing 12b into the supplementary housing 43b where it carries the jaw clutch plate 26b. The sleeve 64 is penetrated by the lengthened shaft 23b of the differential gear 17b. The extended shaft 23b is mounted in the supplementary housing 43b by means of a tapered roller bearing 65. It has there a central bore hole 66 with inner gear teeth 67, which serve for non-rotatable fixation of a drive linkage of a drive axle (so-called linchpin) leading to the vehicle wheel involved (not shown).

The jaw clutch counterplate 31b working in conjunction with the jaw clutch plate 26b is connected non-rotatably with the lengthened shaft 23b of the differential gear 17b. The counterplate 31b has several longitudinally directed bowl-shaped indentations 68 which hold pressure springs 46b which engage the jaw coupling plate 26b. The claws or gear teeth of the jaw clutch plate 26b and the jaw clutch counterplate 31b cooperating with each other are numbered 32b and 33b respectively. The jaw clutch counterplate 31b is also enclosed concentrically by the ring magnet which is designated 29b in the embodiment of FIG. 4, and which is disposed securely in a non-rotatable manner in the supplementary housing 43b. The method of operation of the differential lock according to FIG. 4 corresponds to that for FIGS. 1 and 2, and therefor need not be repeated in detail here.

FIG. 4 makes clear, however, that the locking differential of the invention can be integrated in a space-saving why or installed advantageously especially in the compact drive unit of a front-wheel-drive vehicle, as is visible in FIG. 3, for example.

I wish it to be understood that I do not desire to be limited to the exact details of construction shown and described, for obvious modifications will occur to a person skilled in the art.

The embodiments of the invention in which an exclusive property of privilege is claimed are defined as follows:

1. A differential gear unit for drive axis of motor vehicles having a differential housing and a differential lock comprising jaw clutch which can be completely locked up and which includes a jaw clutch plate which is non-rotatably connected to a differential case for differential gears but is axially displaceable relative thereto, a cooperating jaw clutch counterplate which is mounted non-rotatably and axially non-displaceably on a differential gear drive axle, wherein the jaw clutch plate also serves as an armature for an electromagnet constructed as a ring magnet which is fixed to the differential housing and which is part of an electric circuit which has a switch so that the ring magnet can be switched on and off manually, and the jaw clutch plate can be released from the jaw clutch counterplate by spring means which are biased when the jaw clutch is engaged, is fixed to the differential housing 12, 12a, characterized in that an electronic control unit constructed as a speed sensor, which allows the ring magnet to be switched on only below a predetermined limit speed of the vehicle, or automatically switches the ring magnet off above this limit speed, is disposed in the circuit between the switch and the ring magnet, and that the jaw clutch counterplate is disposed within a space formed by the ring magnet.

2. A differential gear unit according to claim 1, characterized in that the differential housing is formed of a first housing member and a supplemental housing member, and that the jaw clutch plate, the jaw clutch counterplate and the ring magnet are disposed in the supplemental housing member which is connected to the first housing member.

3. A differential gear unit according to claim 2, characterized in that the spring means are compression spring means which are disposed between the jaw clutch plate and the jaw clutch counterplate.

4. A differential gear unit for drive axles of motor vehicles, which has a differential housing and a differential lock comprising a jaw clutch which can be completely locked up and which includes a jaw clutch plate which is non-rotatably connected to a differential case for differential gears, but is axially displaceable relative thereto, a cooperating jaw clutch counterplate which is mounted non-rotatably and axially non-displaceably on a differential gear drive axle, wherein the jaw clutch plate also serves as an armature for an electromagnet constructed as a ring magnet which is energized to engage the jaw clutch plate with the jaw clutch counterplate, and wherein the jaw clutch plate can be released from the jaw clutch counterplate by spring means which are biased when the jaw clutch is engaged, characterized in that the ring magnet is fixed to the differential housing, and the jaw clutch counterplate is disposed within a space formed by the ring magnet.

5. A differential gear unit according to claim 4, characterized in that the differential housing is formed of a first housing member and a supplemental housing member, and that the jaw clutch plate, the jaw clutch counterplate and the ring magnet are disposed in the supplemental housing member.

6. A differential gear unit according to claim 4, characterized in that the spring means are constructed as coil springs which are disposed in indentations in the jaw clutch counterplate.

7. A differential gear unit according to claim 4, characterized in that an electronic control unit constructed as a speed sensor, which allows the ring magnet to be energized only below a predetermined limit speed of the vehicle, or automatically deenergizes the ring magnet above this limit speed, is disposed in an electric circuit between a manually operable switch and the ring magnet which forms part of the electric circuit.

* * * * *